United States Patent Office 3,498,886
Patented Mar. 3, 1970

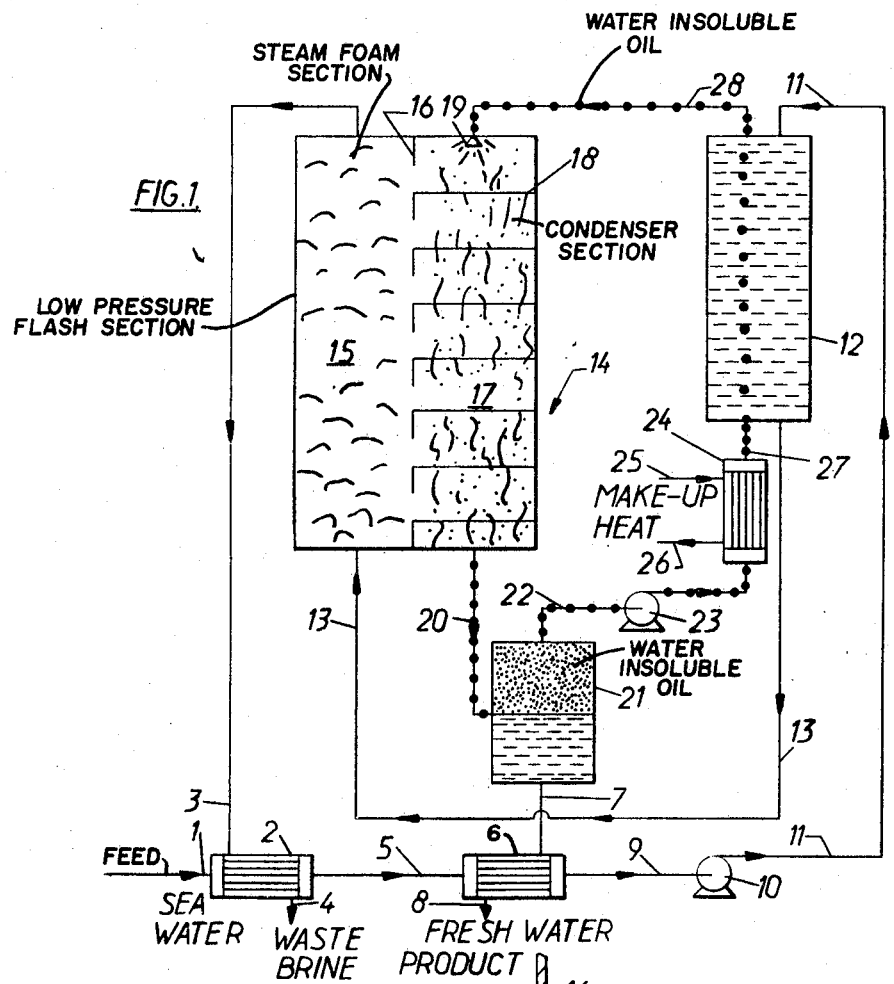
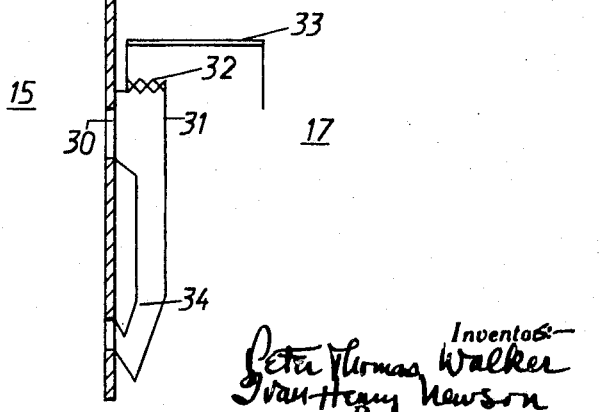

3,498,886
FLASH DISTILLATION PARTITIONED TOWER
Peter Thomas Walker, Reading, and Ivan Henry Newson, Chilton, England, assignors to Weir Westgarth Limited, Glasgow, England, a British company
Filed Apr. 5, 1966, Ser. No. 545,197
Claims priority, application Great Britain, Apr. 5, 1965, 14,447/65
Int. Cl. B01d 3/06
U.S. Cl. 202—167                                                    3 Claims

ABSTRACT OF THE DISCLOSURE

A flash distillation process comprising the steps of heating raw feed liquid, passing the same into the lower portion of a first undivided vertical section of a tower maintained at such pressure that a mixture of vapour and liquid is formed in that section of the tower, withdrawing liquid from the upper part of that section of such tower, effecting condensation of the vapour in a second vertical section of such tower alongside the first section and to which second section access by the unvapourised liquid in the first section is prevented, and removing a liquid condensate from the lower part of such second section.

DESCRIPTION OF INVENTION

This invention relates to flash distillation processes and apparatus, particularly but not exclusively for the desalination of brine.

Fash distillation is one practical method of effecting desalination of sea water in order, for example, to provide fresh water of drinking quality or suitable for agricultural use. In a conventional flash distillation plant the heated brine is caused to flow through a series of flashing chambers in each of which a proportion is converted into steam and is condensed within the chamber in order to provide the fresh water. This condensation is normally effected upon condenser tubes and it can be shown from theoretical considerations that the temperature drop across these tubes must inevitably result in a loss of efficiency. Furthermore, these condensers are cooled by brine and in consequence some form of scaling is almost inevitable within the condenser tubes, thus increasing the loss of efficiency.

It is an object of the invention to provide a new or improved flash distillation process with certain advantages over the conventional process.

According to the present invention a flash distillation process comprises the steps of heating raw feed liquid, passing the same into the lower portion of a tower maintained at such pressure that a mixture of vapour and liquid is formed in the tower, withdrawing liquid from the upper part of such tower, effecting condensation of the vapour in a section of such tower to which section access by the unvapourised liquid is prevented, and removing a liquid condensate from the lower part of such condensation section.

In the case of a desalination process the condensate will represent the fresh water product.

According to a further aspect of the invention, there is provided flash distillation plant comprising a tower divided by a wall into side-by-side sections, such wall allowing vapour to pass therethrough but preventing the passage of liquid, one such section forming a foaming section and having raw liquid inlet and outlet means at its lower and upper parts respectively, and the other such section forming a condensation section and having cooling liquid inlet means at its upper end and condensate outlet means at its lower end.

In our co-pending patent application No. 14450/65 we have disclosed an invention which resides primarily in the use of a water-insoluble oil as a heat transfer medium in desalination processes and we prefer to make use of such an oil with the present technique. Accordingly, the cooling liquid used to effect condensation of the vapour, which is steam in the case of desalination, is preferably such an oil and the liquid condensate is therefore an oil/water mixture.

After leaving the tower the condensate may be passed to an oil/water separator and the product fresh water recovered. The oil may be heated externally by any suitable means, e.g. process steam, and passed to a liquid/liquid contactor to heat the raw feed liquid passing to the base of the foaming section of the tower.

In order that the invention may more readily be understood, one embodiment of the same will now be described with reference to the accompanying drawings, wherein:

FIGURE 1 is a diagrammatic flow sheet, and
FIGURE 2 is a detail of a wall member in the tower of FIGURE 1.

Referring now to the drawings and to FIGURE 1 in particular, raw sea water enters by a conduit 1 and is passed to a tube and shell heat exchanger 2 where it is heated by waste brine entering through conduit 3 and discharged to waste through conduit 4. The heated brine leaves the exchanger 2 through a conduit 5 and is passed to a further tube and shell heat exchanger 6 where it is heated by fresh water entering through conduit 7, and leaving, as product, through conduit 8. The heated brine leaves the exchanger 6 through a conduit 9 and is passed by a pump 10 to a conduit 11 and thence to a liquid/liquid contactor 12.

The brine is heated to the process temperature in this contactor 12 by direct contact with heated oil and leaves through a conduit 13 which conveys it to a brine inlet at the base of a tower 14, the brine entering only the lefthand or columnar flash evaporation chamber 15 of the tower. As can be seen in FIGURE 1, this columnar flash evaporation chamber 15 has no internal divisions but is vertically continuous throughout the height of the tower. The pressure at the base of the columnar chamber 15 may be of the order of atmospheric so that the brine may be at a temperature of the order of 200° F. whilst the pressure at the top of the columnar chamber 15 may be of the order of 1 p.s.i.a. Consequently violent foaming and steam formation will take place in the columnar chamber 15 and the liquid brine remaining is removed through the top outlet conduit 3.

The steam generated in the columnar flash evaporation chamber 15 passes laterally through an apertured vertical partition wall 16 and into a columnar condensing chamber 17 of the tower 14, the liquid brine being prevented from passing through the wall 16. The columnar condensing chamber 17 contains a packing (not shown) and is provided with plates 18 that divide it into a succession of intercommunicating condensing stages disposed one below another down the tower. The apertures in the partition wall 16 are distributed throughout the height of the tower so that vapor passes through from the columnar flash evaporation chamber 15 into all stages of the columnar condensing chamber 17 simultaneously. Condensation is effected by spraying cool oil into the uppermost stage of the columnar condensing chamber 17 through a spray head 19. A mixture of fresh water and oil therefore passes down the columnar condensing chamber 17 from stage to stage and is withdrawn through a conduit 20 to be passed to an oil/water separator 21 from which the fresh water leaves through the conduit 7.

The oil leaves the separator 21 through a conduit 22 and is passed by a pump 23 to a further tube-and-shell heat exchanger 24 which is heated by steam entering and leaving through conduits 25 and 26. The hot oil then goes to the liquid/liquid contactor 12 via a conduit 27 and leaves via a conduit 28 to be passed to the spray head 19.

Clearly the flow sheet is diagrammatic and savings may be effected in known ways, e.g. by recirculation.

The construction of the wall 16 is illustrated in FIGURE 2, and it will be seen that each entry point for steam includes an aperture 30 and a baffle plate 31 against which the steam/water mixture impinges. The steam passes upwardly through a mesh strainer 32 which is protected by a baffle 33. The brine falling from the plate 31 and strainer 32 is collected by a liquid pocket 34 and returned to the columnar flash evaporation chamber 15 through a further aperture in the wall 16. As many vapour entry units as shown in FIGURE 2 will be provided as necessary.

It will be apparent that advantages reside in the arrangement described in that the throat and weir construction of normal flash chambers is avoided, whilst direct brine heating and steam cooling avoid the use of heat exchanger tubes.

We claim:

1. Flash distillation plant for the desalination of sea water or brine comprising a tower, a centrally disposed partition wall within the tower extending from top to bottom thereof, a columnar flash evaporation chamber within the tower on one side only of said partition wall which columnar chamber has no internal divisions but is vertically continuous throughout the height of the tower, a raw liquid feed inlet for brine heated to about 200° F. which is introduced at the bottom of said columnar flash evaporation chamber, the pressure within said columnar flash evaporation chamber decreasing progressively up the tower from said inlet to said outlet whereby the brine is flashed into steam, a columnar condensing chamber within the tower on the opposite side of said partition wall and likewise extending from top to bottom of the tower but divided into a succession of intercommunicating condensing stages disposed one below another down the tower, liquid-vapor separator means associated with said partition wall comprising apertures distributed throughout the height of the partition wall in said tower said separator means allowing said steam to pass laterally through from the columnar flash evaporation chamber into all the stages of the columnar condensing chamber simultaneously but preventing liquid from entering said condensing stages, cooling liquid inlet spray means at the top of said columnar condensing chamber admitting a spray of cooling liquid comprising water-insoluble oil to the uppermost of said condensing stages, and a condensate cooling liquid mixture outlet means at the bottom of said condensing chamber for withdrawing condensate-cooling liquid mixture from the lowermost of said condensing stages.

2. Plant according to claim 1, wherein said liquid-vapor separator means comprise a first set of apertures in said partition wall through which liquid-vapor mixture from the columnar flash evaporation chamber passes, compartments on the condensing chamber side of said wall receiving said liquid-vapor mixture passing through said first set of apertures and each containing a baffle plate on which the liquid-vapor mixture impinges, vapor outlets at the tops of said compartments releasing vapor only into said condensing stages, and a second set of apertures in said wall through which liquid passes back from the bottoms of said compartments into said columnar flash evaporation chamber.

3. Plant according to claim 1, wherein said spray means receives, as cooling liquid, the oil that has passed through said liquid-liquid contactor, and further comprising a separator receiving condensate-oil mixture from said condensate-cooling liquid mixture outlet, a heat exchanger receiving separated oil from said separator and reheating it by heat from an external source, and conduit means recirculating the reheated oil from said heat exchanger to said contactor.

References Cited

UNITED STATES PATENTS

| | | | |
|---|---|---|---|
| 2,976,224 | 3/1961 | Gilliland | 203—10 |
| 3,165,452 | 1/1965 | Williams | 203—11 |
| 3,181,600 | 5/1965 | Woodward et al. | |
| 3,219,554 | 11/1965 | Woodward | 202—173 |
| 3,232,847 | 2/1966 | Hoff | 203—11 |
| 3,236,747 | 2/1966 | Margiloff | 203—11 |
| 3,298,932 | 1/1967 | Bauer | 203—11 |
| 3,312,601 | 4/1967 | Wilson et al. | 203—11 |
| 3,057,786 | 10/1962 | Waddill. | |

WILBUR L. BASCOMB, Jr., Primary Examiner

F. E. DRUMMOND, Assistant Examiner

U.S. Cl. X.R.

202—177, 185, 186, 197; 203—11, 88, 100